J. S. EVANS.
FISHING BAIT.
APPLICATION FILED SEPT. 26, 1918.
1,300,149.
Patented Apr. 8, 1919.
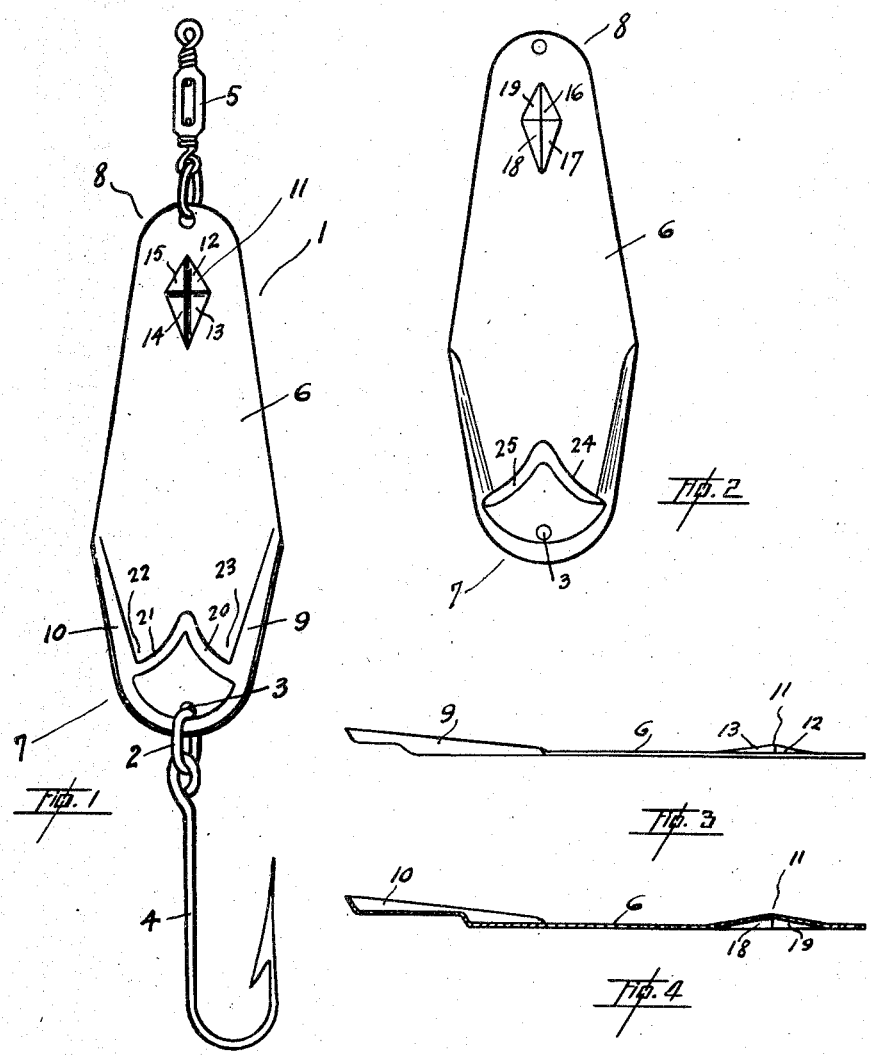
INVENTOR
John Spencer Evans.
BY
ATTYS.

UNITED STATES PATENT OFFICE.

JOHN SPENCER EVANS, OF VICTORIA, BRITISH COLUMBIA, CANADA, ASSIGNOR TO THE CANADIAN FISH HOOK MANUFACTURING CO., OF VICTORIA, BRITISH COLUMBIA, CANADA.

FISHING-BAIT.

1,300,149.      Specification of Letters Patent.      Patented Apr. 8, 1919.

Application filed September 26, 1918. Serial No. 255,836.

*To all whom it may concern:*

Be it known that I, JOHN SPENCER EVANS, a citizen of the United States, and a resident of the city of Victoria, in the Province of British Columbia, Canada, have invented certain new and useful Improvements in Fishing-Baits, of which the following is a specification.

My invention relates to improvements in fishing baits, with more particular reference to artificial spoon baits used in trolling for salmon and other kinds of fish and commonly known as the "wabbler" type of spoon, and the object of my invention is to provide a spoon so formed that the tendency to flop or spin common to other makes of spoons when traveling fast is eliminated, thereby allowing it to be operated at a greater speed without destroying its efficiency so that more fishing ground may be covered than is possible with the spoons in present use. A further object is to devise a spoon of this character having great luring capacity on account of the number of angular surfaces with which it is provided and by means of which increased light reflection is obtained, thus enabling the spoon to be seen at a great distance, the construction of the spoon to obtain the angular surface further insuring great stiffness at the end so that the possibility of the spoon being twisted or deformed by the pull of a very heavy fish is obviated.

I attain these objects by the construction illustrated in the accompanying drawings in which—

Figure 1 is a front view of the complete bait.

Fig. 2 is a back view of the spoon.

Fig. 3 is an edge view of the spoon.

Fig. 4 is a longitudinal sectional view of the spoon taken through the center line.

Similar figures of reference indicate similar parts throughout the several views.

1 indicates generally the spoon portion of the bait, to one end of which is connected by a ring 2 passed through a hole 3 the hook 4, while to its opposite end is connected a swivel 5 by means of which the spoon is attached to a trolling line.

The bait may be made of any size and material and may be used for any kind of fish. The spoon is formed out of a flat piece of metal 6 rounded at both ends, the hook end 7 being preferably of greater width than the swivel end 8, and the edges of the end 7 are turned upwardly as at 9 and 10 so that this is substantially of spoon formation. At a point in the length of the plate 6 nearer to the end 7 than the end 8 it is preferably of greater width than the end 7 so that the edges of the plate taper inwardly toward their respective rounded ends, although this construction need not necessarily be adhered to.

Adjacent the swivel end 8 the surface of the plate on one side of its longitudinal center line is raised by forming a depression in the other side so that an upstanding diamond shaped portion 11 is formed on its upper face, this construction providing eight different inclined surfaces giving eight distinct reflections of light, four of these angles being formed by the upstanding faces 12, 13, 14 and 15, as shown in Fig. 1, and the remaining four by the depressed faces 16, 17, 18 and 19, as shown in Fig. 2. The upper surface of the plate at its hook end is also raised out of the plane of the body and formed as shown in Figs. 1, 2 and 4 so that upstanding angular light-reflecting surfaces 20 and 21 are provided, as shown in Fig. 1, forming with the sides V-shaped pockets 22 and 23, the underside of these surfaces also forming light-reflecting surfaces 24 and 25, or four light-reflecting inclined surfaces in addition to those formed by the diamond 11, so that the spoon is provided altogether with twelve different inclined faces giving twelve distinct reflections of light in different directions in addition to that of the polished plate itself and thus a maximum of light reflection is obtained which, in addition to the elimination of the tendency to flop and turn over, insures that the highest efficiency will result from the use of the hook.

What I claim as my invention is:—

1. A fishing bait formed out of a flat metal plate dished at its rear end and embossed whereby a raised portion substantially triangular in shape is formed on the plate surface within the dished portion.

2. A fishing bait formed out of a flat metal plate dished at its rear end and embossed whereby a raised portion substantially triangular in shape is formed on the plate surface within the dished portion, said plate being also embossed adjacent its forward end whereby a raised portion is formed on the surface substantially diamond shaped.

3. A fishing bait formed out of a flat metal plate dished at its rear end and raised within the dished portion out of the plane of the body whereby a plurality of faces each capable of reflecting light in different directions is formed on each side of the body.

4. A fishing bait formed out of a flat metal plate dished at its rear end and raised within the dished portion and also at a point in its flat forward portion adjacent the end thereof out of the plane of the body whereby a plurality of faces each capable of reflecting light in different directions is formed on each side of the body.

5. A fishing bait formed out of a flat metal plate the end portions of which are of less width than its intermediate portion, its rear end being of greater width than its forward end and having its edges dished, the dished edges extending from the point of greatest width of the plate and a portion of the plate surface between the dished edges being raised out of the plane of the body so that forwardly converging light-reflecting surfaces are formed, the said plate having a raised diamond shaped portion adjacent its forward end.

Dated at Victoria, B. C. this 13th day of Sept. 1918.

JOHN SPENCER EVANS.